United States Patent
Kendall, Jr. et al.

(10) Patent No.: US 12,515,427 B2
(45) Date of Patent: *Jan. 6, 2026

(54) NON-DESTRUCTIVE BELT DETECTION APPARATUS AND METHOD

(71) Applicant: BRIDGESTONE BANDAG, LLC, Nashville, TN (US)

(72) Inventors: James A. Kendall, Jr., Nashville, TN (US); Robert P. Hardy, Nashville, TN (US); Devin T. Smith, Nashville, TN (US); Zachary Milliron, Nashville, TN (US); Jeffrey A. Wachtel, Nashville, TN (US); Matthew J. Abraham, Nashville, TN (US); Jaime J. Benitez, Nashville, TN (US); Jeremiah J. Nartker, Nashville, TN (US); Alexander G. Tomtschik, Nashville, TN (US); Wade L. Terrill, Nashville, TN (US)

(73) Assignee: Bridgestone Bandag, LLC, Nashville, TN (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/098,846

(22) Filed: Jan. 19, 2023

(65) Prior Publication Data

US 2023/0150220 A1   May 18, 2023

Related U.S. Application Data

(63) Continuation of application No. 16/216,263, filed on Dec. 11, 2018, now Pat. No. 11,571,868.
(Continued)

(51) Int. Cl.
*B29D 30/54* (2006.01)

(52) U.S. Cl.
CPC ........ *B29D 30/54* (2013.01); *B29D 2030/541* (2013.01); *B29D 2030/546* (2013.01)

(58) Field of Classification Search
CPC .............. B29D 30/54; B29D 2030/541; B29D 2030/546
(Continued)

(56) References Cited

U.S. PATENT DOCUMENTS

| 5,216,372 A | 6/1993 | Zoughi et al. |
| 5,238,041 A | 8/1993 | Tomita et al. |

(Continued)

FOREIGN PATENT DOCUMENTS

| EP | 1 146 996 B1 | 10/2001 |
| EP | 1 428 624 A2 | 6/2004 |

(Continued)

OTHER PUBLICATIONS

Extended European Search Report on EPO Patent App. No. 18895504.1 dated Aug. 9, 2021, 8 pages.
(Continued)

*Primary Examiner* — Hadi Shakeri

(57) ABSTRACT

Systems and methods of buffing tire casings are provided. A tire buffing machine includes a tire hub assembly selectively rotating a mounted casing, a buffer configured to buff the casing, a tire belt detection apparatus having two or more sensors to detect a first belt depth of one or more belts at a first lateral position in a tire casing and a second belt depth of the one or more belts at a second lateral position within the tire casing, and an electronic controller. The controller determines the first belt depth and the second belt depth using a belt detection apparatus having two or more sensors of the belt detection apparatus and adjusts the operation of the buffer based on the first belt depth or the second belt depth.

20 Claims, 5 Drawing Sheets

Related U.S. Application Data

(60) Provisional application No. 62/612,216, filed on Dec. 29, 2017.

(58) Field of Classification Search
USPC .......................................................... 157/13
See application file for complete search history.

(56) References Cited

U.S. PATENT DOCUMENTS

| | | | |
|---|---|---|---|
| 6,005,397 | A | 12/1999 | Zoughi et al. |
| 6,119,514 | A | 9/2000 | Piacente et al. |
| 6,246,226 | B1 | 6/2001 | Kawase et al. |
| 6,386,024 | B1 | 5/2002 | Marck et al. |
| 6,404,182 | B1 | 6/2002 | Kawase et al. |
| 7,082,819 | B2 | 8/2006 | Thiesen et al. |
| 7,185,534 | B2 | 3/2007 | Stoila et al. |
| 7,972,195 | B2 * | 7/2011 | Ogawa ................ B24B 5/366 451/49 |
| 8,357,026 | B2 | 1/2013 | Manuel et al. |
| 8,434,542 | B2 * | 5/2013 | Manuel ............... B29D 30/54 157/13 |
| 8,662,134 | B2 | 3/2014 | Lindsay et al. |
| 9,011,203 | B2 | 4/2015 | Manuel et al. |
| 9,669,594 | B2 * | 6/2017 | Kost ...................... G01V 3/10 |
| 2002/0088527 | A1 | 7/2002 | Tanaka et al. |
| 2010/0130099 | A1 | 5/2010 | Manuel et al. |
| 2010/0330877 | A1 | 12/2010 | Manuel et al. |
| 2014/0373614 | A1 | 12/2014 | Steinbichler et al. |
| 2017/0173907 | A1 * | 6/2017 | Kendall, Jr. .......... G01B 11/14 |
| 2017/0176175 | A1 | 6/2017 | Lindsay |

FOREIGN PATENT DOCUMENTS

| | | |
|---|---|---|
| EP | 2 173 520 A1 | 4/2010 |
| EP | 3 086 937 A1 | 11/2016 |
| JP | 09-239866 A | 9/1997 |
| JP | 2003-510188 A | 3/2003 |
| JP | 2006-192795 A | 7/2006 |

OTHER PUBLICATIONS

International Search Report & Written Opinion for PCT/US2018/064151 dated Mar. 27, 2021, 12 pages.

Office Action for EP Application No. EP 18895504.1, dated Dec. 19, 2022.

* cited by examiner

NON-DESTRUCTIVE BELT DETECTION APPARATUS AND METHOD

CROSS-REFERENCE TO RELATED APPLICATIONS

This application is a continuation of U.S. patent application Ser. No. 16/216,263, filed Dec. 11, 2018, which claims priority to U.S. Provisional Patent Application No. 62/612,216, filed Dec. 29, 2017, each of which is incorporated herein by reference in its entirety.

The application has been filed following the application of John Lindsay titled "Automated Tire Buffing Identification Apparatus and Method," published as U.S. 2017/0176175 on Jun. 22, 2017, which is herein incorporated by reference in its entirety.

TECHNICAL FIELD

The present invention relates generally to devices and methods for retreading tires, and more particularly to devices and methods for tire buffing.

BACKGROUND

A tire casing selected for retreading may be buffed to remove excess rubber and provide a substantially evenly textured crown for receiving a tread strip or other tread. Tire casings may include a belt package (a package of steel belts or cables) underlying the road-engaging surface (e.g., the original tread) of the tire. The casing may be buffed to leave only a predetermined thickness, e.g., 3/32 of an inch, of material remaining over the top belt. The shoulder of the casing may be also buffed (trimmed) to eliminate or reduce voids or patterns in the shoulder created by the original tread, and to provide, typically, a relatively straight profile between the casing side walls and the crown.

A cured tread strip, which may be of a width corresponding to the width of the crown of the casing, may be cut to the length corresponding to the casing circumference and disposed over the casing crown. Continuous replacement treads in the shape of a ring (i.e., ring treads) have also been used to retread the buffed casing. Thereafter, the assembly may be placed within a curing chamber and subjected to elevated pressure and temperature for a predetermined period of time. The combination of exposure to elevated pressure and temperature for a duration of time binds the cushion gum to both the tire casing and the new tire tread.

The shape and contour of the tire casing being buffed may be important to determining the necessary buffing operations that need to be performed. Some buffing machines are manually operated such that the final product of buffing is dependent on the skill of the operator. In other situations, data pertinent to buffing is stored in the buffing machine and such data may be extracted by the operator for proper buffing to proceed. If the shoulder areas are not sufficiently buffed and trimmed, the tread edges may come loose and/or the cushion gum extending beyond the tread edges will not bond to the casing shoulder. Such problems can reduce the longevity of the retreaded tire and adversely impact the appearance of the retreaded tire. In addition, if the crown surface of a tire casing is overbuffed and the belt package is exposed, the tire casing may be irrecoverably damaged. Further, tire casings are variable in size and shape across brands, within brands, and even as casings age. As such, errors and damage occur during buffing processes even if a tire casing is accurately identified and buffed within corresponding, standard parameters.

Thus, there exists a need for a tire buffing machine capable of accounting for variance across tire casings during the buffing process.

SUMMARY

A tire buffing machine may include a tire hub assembly selectively rotating a casing mounted thereon, a buffer configured to buff the casing mounted on the tire hub assembly, a belt detection apparatus having two or more sensors configured to detect a first belt depth of one or more belts at a first lateral position within a tire casing and a second belt depth of the one or more belts at a second lateral position within the tire casing, and an electronic controller. The electronic controller may be communicatively coupled to the buffer and the belt detection apparatus. The electronic controller may be programmed to determine the first belt depth and the second belt depth based on the two or more sensors of the belt detection apparatus. The electronic controller may be programmed to adjust the operation of the buffer based on the first belt depth or the second belt depth.

In some instances, a tire buffing machine includes a controller that may enable the tire buffing machine to buff a casing while monitoring the location of a belt package disposed therein, the controller including instructions stored on non-transient data media causing the controller to perform operations. The operations may include maintaining a database containing a plurality of casing profiles, each casing profile including corresponding buffing parameters. The operations may further include operating a buffer to buff the casing in accordance with buffing parameters associated with one of the plurality of casing profiles. The operations may include determining a first belt depth at a first lateral position within a tire casing and a second belt depth at a second lateral position within the tire casing using a belt detection apparatus having two or more sensors configured to detect the first belt depth and the second belt depth within the tire casing. The operations may include adjusting the operation of the buffer based on the first belt depth or the second belt depth.

In some embodiments, a method may be used to manufacture a retreaded tire casing. The method may include maintaining, in a database, a plurality of casing profiles, each casing profile including corresponding buffing parameters. The method may further include operating a buffer to buff the casing in accordance with buffing parameters in one of the plurality of casing profiles. The method may include determining, by a controller, a first belt depth at a first lateral position within a tire casing and a second belt depth at a second lateral position within the tire casing using a belt detection apparatus having two or more sensors configured to detect the first belt depth and the second belt depth within the tire casing. The method may include adjusting, by the controller, the operation of the buffer based on the first belt depth or the second belt depth.

The features of the present invention will become apparent to one of ordinary skill in the art upon reading the detailed description and claims, in conjunction with the accompanying drawings, provided herein. The scope of this disclosure includes various changes and modifications to the embodiments without departing from the spirit and scope of the present invention.

DETAILED DESCRIPTION

Figure 1:
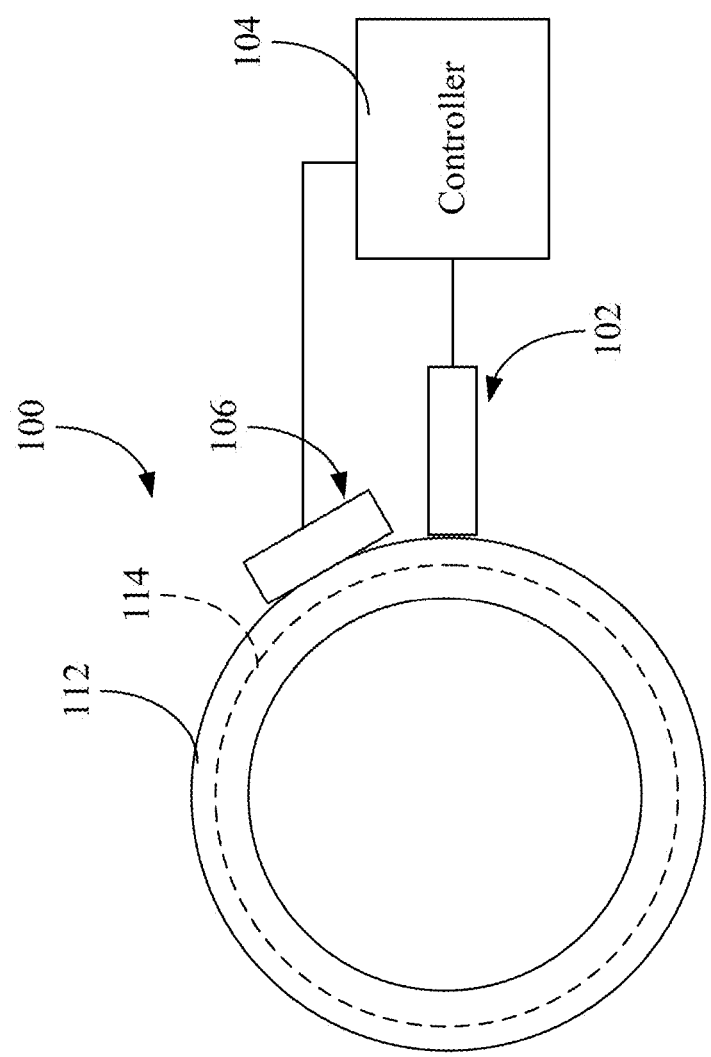
FIG. 1 is a schematic view of a belt detection and tire buffing apparatus.

An illustrative tire buffing apparatus 100 is shown in FIG. 1. The apparatus 100 includes a rasp pedestal 102, a controller 104, and a measurement subsystem including a belt detection apparatus 106.

The rasp pedestal 102 is configured to remove material from a tire casing 112 to predetermined tire casing parameters with a desired surface texture. In various embodiments, the rasp pedestal 102 may include a rasp head housing a rasp or a rotary blade configured to strip material from outer surfaces of the tire casing 112. The rasp head may further include a texturing brush, which may be applied to casing surfaces to impart a specified texture to crown and shoulder portions of the tire casing 112 to facilitate a subsequent retreading process.

The controller 104 is a computing system communicatively coupled to the other components of the apparatus 100, and is configured to measure the tire casing 112 and correct the operation of the rasp pedestal 102 during a buffing process. In some embodiments, the operations discussed with respect to the controller 104 are performed by a plurality of separate controllers acting as a single controller, or a plurality of computing components of the same controller that operate the buffer and measure the tire casing 112.

In some arrangements, the controller 104 includes an operator input/output ("I/O") device and a database. The operator I/O includes hardware and associated logics sufficient to allow the controller 104 to exchange information with a human operator. For example, an input aspect of the operator I/O of the controller 104 may include any of a mechanical keyboard, a touchscreen, a microphone, a keypad, and so on. The output aspect of the operator I/O may include a digital display, one or more illuminating signal lights, speakers, and so on. The database includes a non-transient data storage medium, which may include, for example, local hard drives or a networked data server. The database stores instructions carried out by the controller 104, including instructions for buffing procedures. The database may also include information relating to a plurality of buffing parameter profiles (e.g., desired crown and shoulder characteristics, minimum belt depths, etc.) corresponding to a plurality of tire casing sizes and specifications. As such, an operator may interact with the controller 104 via the operator I/O to select an appropriate casing profile and initiate a buffing procedure.

The controller 104 is electrically coupled to the rasp pedestal 102, and may be configured to adjust the buffing process while the rasp pedestal 102 is in operation. The rasp pedestal 102 may be coupled to one or more rails, hinges, pivots, etc. and corresponding actuators configured to allow the rasp pedestal 102 and/or components disposed thereon (e.g., a rasp head) various ranges of movement relative to the tire casing 112. In addition, the controller 104 may be communicatively coupled to one or more motors configured to effect various cut depths and movement patterns of the rasp disposed on the rasp pedestal 102. The controller 104 can be associated with a current sensor which senses the current draw of a rasp drive motor for rotating the rasp head and the texturing device. The rasp drive motor can have a predetermined full-load capacity at which its current draw is a particular value and at which the motor can remove material from the tire casing 112 at an efficient rate while preventing damage to the motor or other components of the tire buffer. The value of the predetermined target current draw can be based upon such considerations as the capabilities of the motor driving the cutter, the maximum depth of cut for the selected cutter, the maximum traverse speed the buffer is capable of generating, and the wear of the cutter itself. The controller 104 can compare the actual current draw of the rasp drive motor to the calculated target current draw and determined whether the actual current draw is equal to the target current draw. If the actual and target current draws are different, the controller can move the rasp pedestal 102 at different rates of speed by selectively controlling the rasp moving assembly to adjust the actual current draw such that it moves toward the target current draw. The traverse rate of speed of the rasp pedestal 102 can be increased to increase the actual current draw of the motor and decreased to decrease the actual current draw of the motor.

The controller 104 is in data receiving communication with the belt detection apparatus 106. In some implementations, the controller 104 may be in data receiving communication with other sensors, such as distance sensors for detecting a distance of the tire casing 112. In some arrangements, the belt detection apparatus 106 can be mounted to the rasp pedestal 102 and can be configured to measure a distance of one or more belts 114 within the tire casing 112 with respect to the rasp pedestal 102.

The belt detection apparatus 106 is a measurement device configured to determine the depth of a set of belts 114 within the tire casing 112. The belt detection apparatus 106 may include one or more measurement sensors suited to determine distance to a metallic component (e.g., the belts 114) relative to the belt detection apparatus 106 itself. In some arrangements, the belt detection apparatus 106 is configured to determine the distance of the belts 114 relative to the rasp pedestal 102, and in turn, the rasp disposed within the rasp pedestal 102. In one arrangement, the belt detection apparatus 106 includes one or more sensors such as magnetic field sensors, inductive sensors, etc. The belt detection apparatus 106 may be able to provide the controller 104 with data indicative of a position or depth of one or more belts 114 within the tire casing 112. In turn, the controller 104 may be configured to use the data provided by the belt detection apparatus 106 to determine a distance of one or more of the belts 114 relative to the rasp pedestal 102 or a rasp of the rasp pedestal 102.

In operation, the controller 104 may use the data indicative of a distance or position between the rasp pedestal 102 or rasp and the set of belts 114 within the tire casing 112 to control the operation of the rasp. In some implementations, one or more distance sensors may be implemented to detect a distance of the tire casing relative to the rasp or rasp pedestal 102 prior to and after the rasp or rasp pedestal, such as described in U.S. patent application Ser. No. 14/972,251, entitled "Self Correcting Tire Buffing Apparatus and Method," filed Dec. 17, 2015. In response to distance data received, the controller 104 may adjust the operation of the rasp in the rasp pedestal 102 (e.g., to reduce a cut depth if the amount of removed casing material is unexpectedly high). As such, the controller 104 may be able to adjust the buffing process to accommodate variances in the belt location 114 across various similarly sized casings, variances in casing material properties (e.g., density, hardness, etc.). Additional features and details of the buffing apparatus 100 are discussed below.

A tire hub assembly can be configured to provide a mount for the tire casing 112 during a buffing process. In some embodiments, the tire hub assembly is configured to engage a center aperture in the tire casing 112 (i.e., similar to a rim engaging the tire casing), orient the tire casing 112 on a center axis (i.e., a rotational axis of the tire casing), and inflate the tire casing 112. For example, in some embodiments, the tire hub assembly includes an expandable tire chuck (i.e., an expandable rim) having a plurality of radial pistons (e.g., pneumatically or hydraulically actuated). The tire chuck of the tire hub assembly may be disposed in a contracted configuration during an initial casing mounting process, and may subsequently expand (i.e., via actuation of the plurality of radial pistons) to engage a center aperture (e.g., defined by a casing bead) of the tire casing 112. The tire chuck may be further configured to expand in a manner sufficient to orient the tire casing 112 on a center axis. In addition, the tire hub assembly may include an airflow line in fluid providing communication with an interior portion of the tire casing 112, thereby allowing the tire casing 112 to be inflated. The tire hub assembly may further be operatively coupled to a motor with a rotational output at the tire chuck, and as such, the tire hub assembly may cause the tire casing 112 to rotate during a buffing process. In some arrangements, the tire hub assembly is electrically coupled to the controller 104, which may control the various operations discussed above.

A pedestal movement assembly is configured to provide a range of motion for the rasp pedestal 102. The pedestal movement assembly may be configured to allow the rasp pedestal 102 to travel along an X and a Y axis to approach and position the rasp or brush with respect to a mounted casing. The pedestal movement assembly may further allow the rasp pedestal 102 to rotate about a Z axis to allow the rasp disposed therein to engage the tire casing 112 at specified angles, for example to buff shoulder portions of the casing. In one arrangement, the pedestal movement assembly includes respective sets of rails and bearings corresponding to the X and Y axes, and a pivot hinge disposed at a base portion of the rasp pedestal 102 to enable Z axis rotation.

In operation, an operator may dispose the tire casing 112 onto a contracted tire chuck of the tire hub assembly. The operator may use the operator I/O of the controller 104 to identify an appropriate casing profile to be applied and initiate a buffing process. The controller 104 may then cause the tire chuck of the tire hub assembly to expand, engage, and orient the tire casing 112 about a center axis. The rasp pedestal 102 may approach the tire casing 112 along an X axis via the pedestal movement assembly and perform a buffing process pursuant to a selected casing profile.

Figure 2:
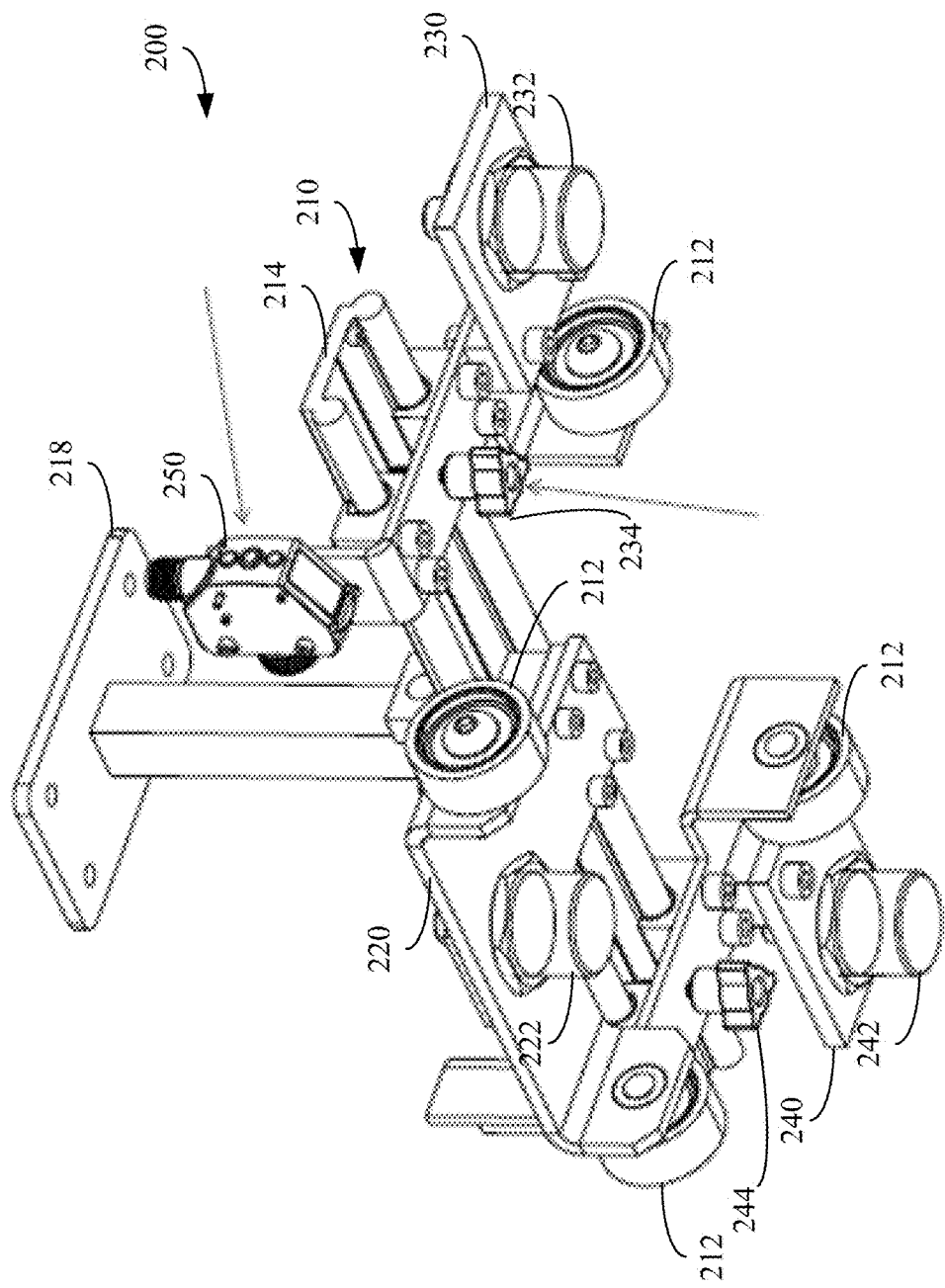
FIG. 2 is a front perspective view of a belt detection apparatus.
Figure 3:
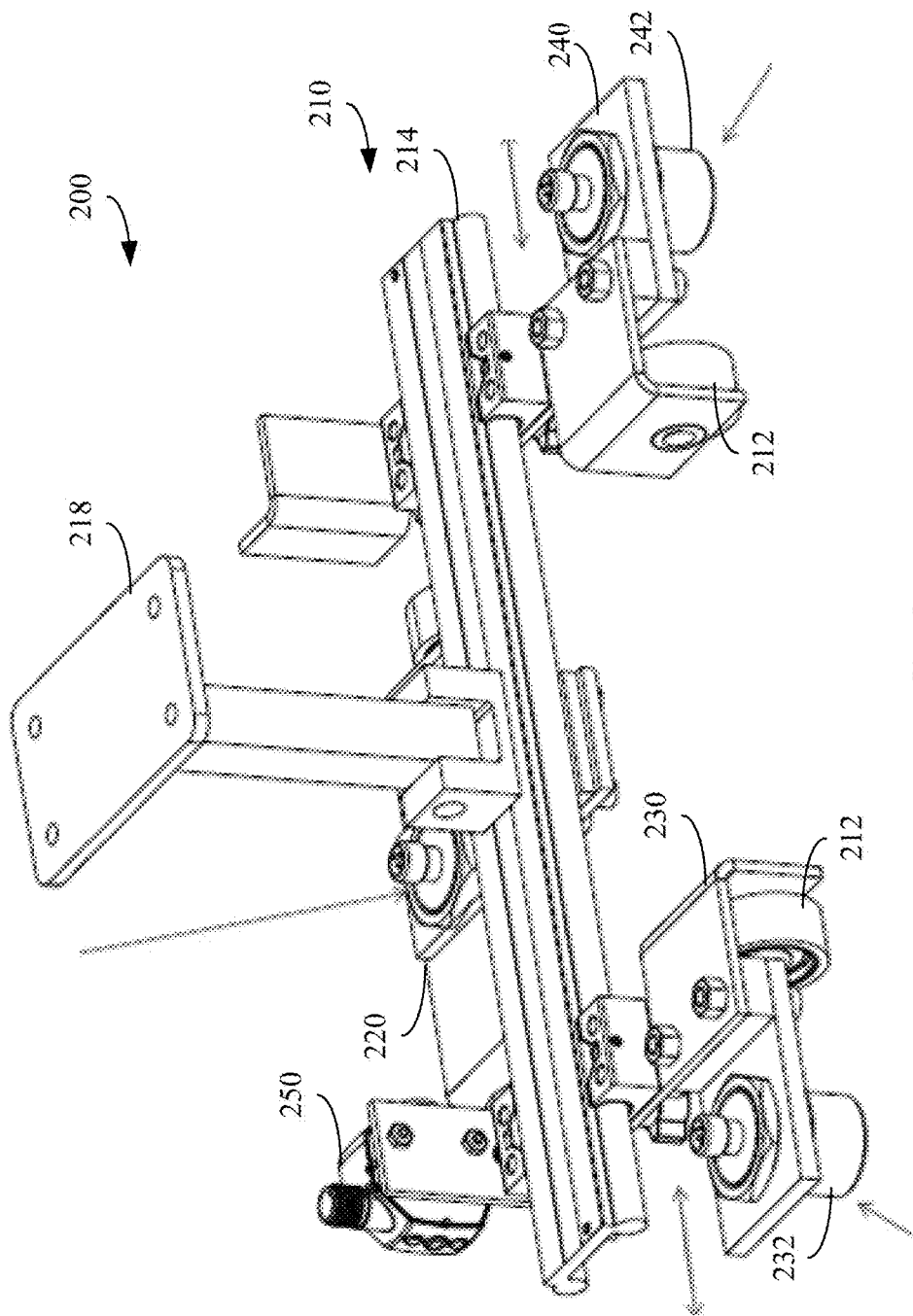
FIG. 3 is a rear perspective view of the belt detection apparatus of FIG. 2.

Referring now to FIGS. 2-3, a belt detection apparatus 200 includes a frame 210 having one or more wheels 212 that contact and roll along an exterior of a tire casing during a buffing operation. In some implementations, the wheels 212 may be omitted and the frame 210 may be positioned relative to the tire casing via a moveable arm or other support in order to maintain a constant distance from the casing. The frame 210 is pivotally mounted to a mount 218 that can be coupled to another component, such as a stand or a robotic arm (e.g., pneumatic cylinders).

The frame 210 includes a center sensor mount 220, a right sensor mount 230, and a left sensor mount 240. The center sensor mount 220, right sensor mount 230, and left sensor mount 240 can be fixedly attached to the frame 210 or may be adjustably or otherwise moveably coupled to the frame 210. The center sensor mount 220, right sensor mount 230, and left sensor mount 240 each include a mount for a sensor 222, 232, 242. The sensors 222, 232, 242 can include inductive sensors or other sensors configured to detect a distance to a metallic material. The center sensor mount 220 may be configured to monitor an undertread depth of one or more belts during a buffing process. In some embodiments, one or multiple of the three sensors 222, 232, 242 may monitor an undertread depth of one or more belts during a buffing process.

The frame 210 includes one or more slides 214 to slide the right sensor mount 230 and/or left sensor mount 240 relative to the frame along a horizontal axis of the belt detection apparatus 200. The horizontal axis may be parallel to an axial axis of a subject tire casing such that the right sensor mount 230 and/or left sensor mount 240 can be adjusted relative to a width of a subject tire. That is, a position of the right sensor 232 and/or left sensor 242 can be adjustable to accommodate multiple tire casing widths. In some embodiments, the right sensor 232 and/or left sensor 242 may be placed over a respective edge of the widest working belt. The right sensor 232 and/or left sensor 242 can be adjusted to a position corresponding to a respective left or right shoulder of the tire casing. That is, the right sensor 232 can be positioned over a left shoulder of the tire casing and the left sensor 242 can be positioned over the right shoulder of the tire casing. With the center sensor 222 over a central plane of the tire casing and the left and right sensors 232, 242 over the left and right shoulders of the tire casing, the sensors 222, 232, 242 can detect the position of the one or more belts within the tire casing at three different positions such that a minimum tire casing depth can be maintained during the buffing process even if the belts are at different depths across a cross-sectional plane of the tire casing. Thus, the sensors 222, 232, 242 can determine the depth of the one or more belts before or during the buffing process and/or monitor a position of the one or more belts during the buffing process. A lock 234, 244 can be selectively engaged and disengaged to secure and/or move each of the right sensor mount 230 and/or left sensor mount 240. In some implementations, the center sensor mount 210 may also be coupled to the one or more slides 214 and be slidable or otherwise movable relative to the frame 210. In some implementations, an actuator or other component may be integrated into the frame 210 to automatically move and/or reposition the right sensor mount 230 and/or left sensor mount 240. In some implementations, when a tire casing type or width dimension of a tire casing is input via an operator I/O of the controller 104, the actuator(s) can automatically adjust the position of the right sensor mount 230 and/or left sensor mount 240 to a predetermined position based on the input tire casing type or width dimension of the tire casing. Beneficially, monitoring the sensors 222, 232, 242 allows for the system to avoid the damaging belts due to an improper buff radius or a raised edge along a shoulder.

Figure 4:
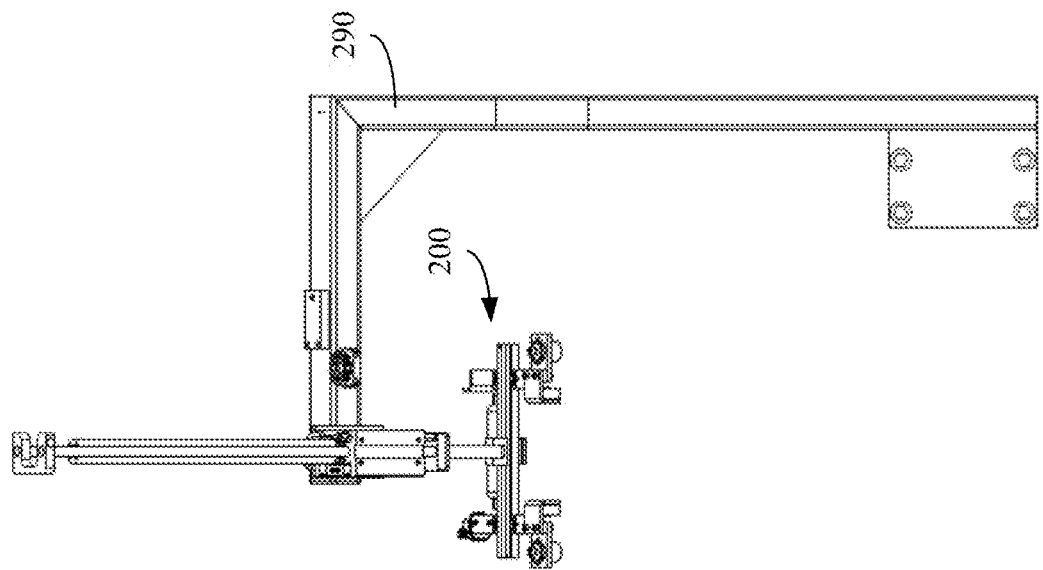
FIG. 4 is a side view of the belt detection apparatus of FIG. 2, including a mount assembly.

The belt detection apparatus 200 can also include a distance sensor 250 mounted to one of the right sensor mount 230 or the left sensor mount 240. The distance sensor 250 may be a laser distance sensor 250 configured to measure a distance between the right sensor mount 230 and the left sensor mount 240. The distance sensor 250 can be used to determine if there is adequate space between the right sensor 232 and the left sensor 242 such that the right sensor 232 and left sensor 242 are positioned above the left shoulder and right shoulder of the tire casing to detect a left end of the one or more belts and a right end of the one or more belts, respectively. If a distance measured by the distance sensor 250 is above or below a predetermined distance for the tire casing, then the buffing process may be aborted or not started. In some embodiments, a casing width may be the distance measured by the distance sensor 250. In some implementations, the belt detection apparatus 200 can be coupled or mounted to a stand 290, as shown in FIG. 4. In some embodiments, the frame 210 may be adjustable such that the fixed center sensor 222 is able to move left or right by moving the frame 210 left of right.

The three sensors 222, 232, 242 are positioned in a triangular pattern to measure distances of the one or more belts in the tire casing during a buffing process. The center sensor 222 is positioned in a center of a tire casing while the left and right sensors 232, 242 can be positioned over a respective left or right shoulder of the tire casing. Thus, the sensors 222, 232, 242 can measure the different distances to the one or more belts within the tire casing such that the a minimum amount of tire casing above the one or more belts can be maintained. The distance sensor 250 can be included to determine a spacing or distance between the right sensor mount 230 and the left sensor mount 240 to determine if there is adequate spacing and that the right sensor mount 230 and/or left sensor mount 240 are positioned over the shoulders of the tire casing. The distance measurement by the distance sensor 250 can ensure proper set up of the belt detection apparatus 200 prior to a buffing process. In some implementations, if the distance measured by the distance sensor 250 is not within a predetermined error range of a target width, then the buffing process may be aborted. The target width can be based on a tire casing width dimension, either manually entered or determined using a look-up table.

The frame 210 shown in FIGS. 2-3 includes four wheels 212 that contact a crown surface of a tire casing during the buffing process. As the wheels 212 have a predetermined diameter and position relative to the frame 210, the distance between the crown surface of the tire casing and each of the sensors 222, 232, 242 is known. In the implementation shown, two wheels 212 are rotatably mounted with the center sensor mount 220 and a single wheel 212 is mounted to each of the right sensor mount 230 and left sensor mount 240. The set of wheels 212 for the center sensor mount 220 are fixed relative to the frame 210 while the wheels 212 for the right sensor mount 230 and left sensor mount 240 are fixed to each of the right sensor mount 230 and left sensor mount 240 and are adjustable along the horizontal axis with the right sensor mount 230 and left sensor mount 240. As each wheel 212 is positioned with a contact point with the tire casing at a known distance relative to the corresponding center, left, and right sensor mounts, 220, 230, 240, the distance between each sensor 222, 232, 242 and each wheel 212 for the corresponding center, left, and right sensor mounts, 220, 230, 240 is known as is a distance from the contact point of a corresponding wheel to a corresponding each sensor 222, 232, 242. The distance for a detected one or more belts by each sensor 222, 232, 242 can be calculated by subtracting the vertical distance between the contact point of the corresponding wheel 212 from a measured distance by a corresponding sensor 222, 232, 242. In some embodiments, distance for a detected one or more belts by each sensor 222, 232, 242 can be calculated by subtracting the vertical distance between the contact point of the crown of the tire from a measured distance by a corresponding sensor 222, 232, 242

In some implementations, the belt detection apparatus 200 can be selectively lowered to an active position and raised to a stored position relative to a tire casing using a pneumatic cylinder. The selective lowering of the belt detection apparatus 200 can be performed automatically when a buffing process is initiated. In some implementations, the raising of the belt detection apparatus 200 can be performed automatically when a pre-determined depth of tire casing above the one or more belts is met based on the measurements from the sensors 222, 232, 242. In some instances, the belt detection apparatus 200 can be raised at any time the buffing process is paused.

Figure 5:
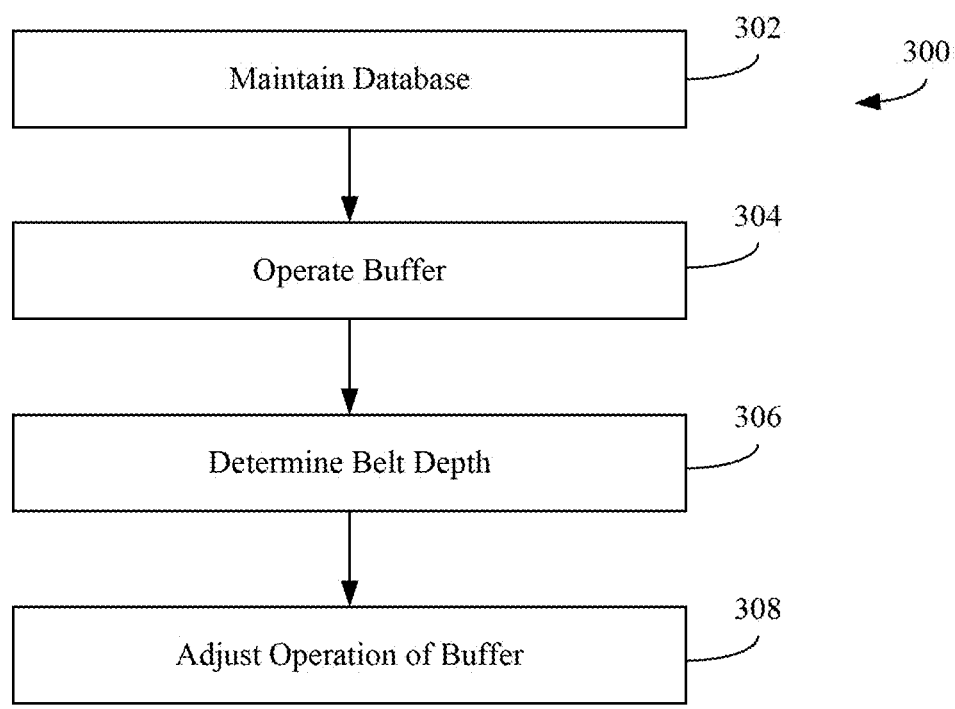
FIG. 5 is a block flow chart diagram of a method of buffing a tire casing, according to an example embodiment.

Referring to FIG. 5, a method 300 of buffing a tire casing using a buffer (e.g., the apparatus 100) with a controller (e.g., the controller 104) is provided. At 302, a database (e.g., the database of the controller 104) maintains instructions carried out by the controller, including instructions for buffing procedures. The database also maintains information relating to a plurality of buffing parameter profiles (e.g., desired crown and shoulder characteristics, minimum belt depths, etc.) corresponding to a plurality of tire casing sizes and specifications.

At 304, the buffer is operated to buff a mounted tire casing (e.g., the tire casing 112) pursuant to parameters for a buffer parameter profile maintained the database. In operation during a buffing process, the tire casing 112 is engaged to the rasp of the rasp pedestal 102. The tire hub assembly may be configured to rotate the tire casing 112 as the rasp removes casing material from the outer circumference of the tire casing 112. The tire casing may be buffed to position a set of belts (e.g., the belts 114) at a predetermined depth beneath the crown surface of the tire casing. A belt detection apparatus (e.g., the belt detection apparatus 200) measures the depth of the belts at 306, which may be performed on a continuous or periodic basis (e.g., once for every rotation of the tire casing). The belt detection apparatus 200 provides the controller 104 with data corresponding to one or more depths of the one or more belts 114 within the tire casing 112 from the sensors 222, 232, 242. As such, the controller 104 may continuously or periodically (e.g., once per rotation of the tire casing 112) monitor the amount of tire casing material remaining using the sensors 222, 232, 242 during the buffing process. The controller 104 may check an amount of remaining tire casing material with the belt depth provided by the belt detection apparatus 200 and adjust the cut depth of the buffer accordingly.

In response to the measurements and calculations with respect to the tire casing 112, the controller 104 may adjust the buffing process, at 308, to prevent over or under-buffing of the tire casing 112 (e.g., adjusting a buffer cut depth). In some arrangements, the controller 104 may be configured to halt the operation of the rasp if the belt depth meets or falls below a predetermined minimum belt depth (e.g., as indicated in a corresponding casing profile in the database). For example, the controller 104 may determine that the one or more belts 114 are $4/32"$ below the surface of the tire casing 112, and the current cut depth of the buffer is set for $3/32"$ per pass. Where the target belt depth is $2/32"$ below the crown surface of the tire casing 112, the controller 104 may reduce the cut depth of the buffer from $3/32"$ to $2/32"$, and as such, the next buffing pass will yield a belt depth of $2/32"$.

When the buffing process 300 is finished, the apparatus can disengage the rasp and/or the belt detection apparatus 200 to be returned to a stored position such that the buffed tire casing can be removed from the apparatus.

A tire buffing machine can include a controller enabling the tire buffing machine to buff a casing while monitoring the location of a belt package disposed therein. The controller includes instructions stored on non-transient data media causing the controller to perform operations of maintaining a database containing a plurality of casing profiles, each casing profile including corresponding buffing parameters; operating a buffer to buff the casing in accordance with buffing parameters associated with one of the plurality of casing profiles; determining a first belt depth at a first lateral position within a tire casing and a second belt depth at a second lateral position within the tire casing using a belt detection apparatus having two or more sensors configured to detect the first belt depth and the second belt depth within the tire casing; and adjusting the operation of the buffer based on the first belt depth or the second belt depth. The belt detection apparatus can include one or more wheels configured to ride on an exterior surface of the tire casing. The belt detection apparatus can include a distance sensor. A first sensor of the two or more sensors can be mounted to a left sensor mount, a second sensor of the two or more sensors can be mounted to a right sensor mount, and the distance sensor can be configured to measure a distance between the left sensor mount and the right sensor mount. The belt detection apparatus can include a center sensor and a center sensor mount. The two or more sensors can be inductive sensors. The controller can adjust a cut depth of the buffer based on the first belt depth or the second belt depth. The controller can be configured to stop the operation of the buffer if the first belt depth or the second belt depth reaches a predetermined minimum depth specified in the one of the plurality of casing profiles.

A method of manufacturing a retreaded tire casing may include maintaining, in a database, a plurality of casing profiles, each casing profile including corresponding buffing parameters; operating a buffer to buff the casing in accordance with buffing parameters in one of the plurality of casing profiles; determining, by a controller, a first belt depth at a first lateral position within a tire casing and a second belt depth at a second lateral position within the tire casing using a belt detection apparatus having two or more sensors configured to detect the first belt depth and the second belt depth within the tire casing; and adjusting, by the controller, the operation of the buffer based on the first belt depth or the second belt depth. The belt detection apparatus can include one or more wheels configured to ride on an exterior surface of the tire casing. The belt detection apparatus can include a distance sensor. The first sensor of the two or more sensors can be mounted to a left sensor mount, a second sensor of the two or more sensors can be mounted to a right sensor mount, and the distance sensor can be configured to measure a distance between the left sensor mount and the right sensor mount. The belt detection apparatus can include a center sensor and a center sensor mount. The two or more sensors can be inductive sensors. The controller can be configured to stop the operation of the buffer if the first belt depth or the second belt depth reaches a predetermined minimum depth specified in the one of the plurality of casing profiles.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

While the invention is described herein in connection with certain preferred embodiments, there is no intent to limit the present invention to those embodiments. On the contrary, it is recognized that various changes and modifications to the described embodiments will be apparent to those skilled in the art upon reading the foregoing description, and that such changes and modifications may be made without departing from the spirit and scope of the present invention. The inventors expect skilled artisans to employ such variations as appropriate, and the inventors intend for the invention to be practiced otherwise than as specifically described herein. Accordingly, the intent is to cover all alternatives, modifications, and equivalents included within the spirit and scope of the invention. Moreover, any combination of the above-described elements in all possible variations thereof is encompassed by the invention unless otherwise indicated herein or otherwise clearly contradicted by context.

The invention claimed is:

1. A tire buffing machine, comprising:
   a tire hub assembly configured to selectively rotate a casing mounted thereon, wherein the casing defines a first lateral side and a second lateral side opposite the first lateral side;
   a buffer configured to buff the casing mounted on the tire hub assembly;
   a belt detection apparatus having a first sensor proximate the first lateral side of the casing, the first sensor being configured to detect a first belt depth of one or more belts at a first lateral position within the casing, a second sensor proximate the second lateral side of the casing, the second sensor being configured to detect a second belt depth of the one or more belts at a second lateral position within the casing, and a third sensor configured to measure a lateral distance between the first sensor and the second sensor; and
   an electronic controller communicatively coupled to the buffer and the belt detection apparatus, the electronic controller being programmed to:
      operate the buffer to buff the casing in accordance with buffing parameters associated with a casing profile corresponding to the casing among a plurality of casing profiles;
      operate the buffer in response to a determination that the lateral distance between the first sensor and the second sensor is within a predetermined distance range associated with the casing profile corresponding to the casing;
      determine the first belt depth and the second belt depth based on the first sensor and the second sensor of the belt detection apparatus; and
      adjust the operation of the buffer based on the first belt depth or the second belt depth.

2. The tire buffing machine of claim 1, wherein the belt detection apparatus includes one or more wheels configured to ride on an exterior surface of the casing.

3. The tire buffing machine of claim 2, wherein the first sensor is mounted to a left sensor mount, the second sensor is mounted to a right sensor mount, and the third sensor is configured to measure a distance between the left sensor mount and the right sensor mount.

4. The tire buffing machine of claim 3, wherein the belt detection apparatus comprises a center sensor and a center sensor mount.

5. The tire buffing machine of claim 4, wherein the buffer comprises a rasp.

6. The tire buffing machine of claim 1, wherein the controller adjusts a cut depth of the buffer based on the first belt depth and the second belt depth.

7. The tire buffing machine of claim 1, wherein the controller is configured to stop the operation of the buffer if the first belt depth or the second belt depth reaches a predetermined minimum depth.

8. A tire buffing machine, comprising:
a controller enabling the buffing machine to buff a casing while monitoring the location of a belt package disposed therein, the controller including instructions stored on non-transient data media to cause the controller to be configured to:
maintain a database containing a plurality of casing profiles, each casing profile including corresponding buffing parameters;
operate a buffer to buff the casing in accordance with buffing parameters associated with one of the plurality of casing profiles;
determine a first belt depth at a first lateral position within the casing and a second belt depth at a second lateral position within the casing using a belt detection apparatus having two or more sensors including a first sensor configured to detect the first belt depth and a second sensor configured to detect the second belt depth within the casing;
adjust the operation of the buffer based on the first belt depth or the second belt depth;
determine, by a third sensor of the two or more sensors, a lateral distance between the first sensor and the second sensor; and
operate the buffer in response to determining that the lateral distance between the first sensor and the second sensor is within a predetermined distance range associated with one of the casing profiles.

9. The tire buffing machine of claim 8, wherein the belt detection apparatus includes one or more wheels configured to ride on an exterior surface of the casing.

10. The tire buffing machine of claim 8, wherein the first sensor is mounted to a left sensor mount, the second sensor is mounted to a right sensor mount, and the third sensor is configured to measure a distance between the left sensor mount and the right sensor mount.

11. The tire buffing machine of claim 8, wherein the belt detection apparatus comprises a center sensor and a center sensor mount.

12. The tire buffing machine of claim 8, wherein the two or more sensors comprise an inductive sensor.

13. The tire buffing machine of claim 8, wherein the controller adjusts a cut depth of the buffer based on the first belt depth or the second belt depth.

14. The tire buffing machine of claim 8, wherein the controller is configured to stop the operation of the buffer if the first belt depth or the second belt depth reaches a predetermined minimum depth specified in the one of the plurality of casing profiles.

15. A method of manufacturing a retreaded tire casing defining a first lateral side and a second lateral side opposite the first lateral side, the method comprising:
maintaining, in a database, a plurality of casing profiles, each casing profile including corresponding buffing parameters;
operating a buffer to buff the casing in accordance with buffing parameters in one of the plurality of casing profiles;
determining, by a controller, a first belt depth at a first lateral position proximate the first lateral side within a tire casing and a second belt depth at a second lateral position proximate the second lateral side within the tire casing using a belt detection apparatus having two or more sensors including a first sensor and a second sensor respectively configured to detect the first belt depth at the first lateral side and the second belt depth at the second lateral side within the tire casing;
adjusting, by the controller, the operation of the buffer based on the first belt depth or the second belt depth;
determining, by a third sensor of the two or more sensors, a lateral distance between the first sensor and the second sensor; and
operate the buffer in response to determining that the lateral distance between the first sensor and the second sensor is within a predetermined distance range associated with one of the casing profiles.

16. The method of claim 15, wherein the belt detection apparatus includes one or more wheels configured to ride on an exterior surface of the tire casing.

17. The method of claim 15, wherein the first sensor of the two or more sensors is mounted to a left sensor mount, the second sensor of the two or more sensors is mounted to a right sensor mount, and the third sensor is configured to measure a distance between the left sensor mount and the right sensor mount.

18. The method of claim 17, wherein the belt detection apparatus comprises a center sensor and a center sensor mount.

19. The method of claim 18, wherein two or more sensors comprise an inductive sensor.

20. The method of claim 15, wherein the controller is configured to stop the operation of the buffer if the first belt depth or the second belt depth reaches a predetermined minimum depth specified in the one of the plurality of casing profiles.

* * * * *